US012145675B2

(12) United States Patent
Cash et al.

(10) Patent No.: US 12,145,675 B2
(45) Date of Patent: *Nov. 19, 2024

(54) MOBILE GOLF SIMULATION SYSTEM

(71) Applicant: TC GLOBAL HOLDINGS LLC, Washington, DC (US)

(72) Inventors: Tari Cash, Washington, DC (US); Jim Coates, Dumfries, VA (US)

(73) Assignee: TC GLOBAL HOLDINGS LLC, Washington, DC (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/829,475

(22) Filed: Jun. 1, 2022

(65) Prior Publication Data
US 2022/0289324 A1    Sep. 15, 2022

Related U.S. Application Data

(63) Continuation of application No. 17/558,273, filed on Dec. 21, 2021, now Pat. No. 11,352,079.
(Continued)

(51) Int. Cl.
*B62D 63/06* (2006.01)
*A63B 24/00* (2006.01)
(Continued)

(52) U.S. Cl.
CPC ........ *B62D 63/061* (2013.01); *A63B 24/0021* (2013.01); *A63B 71/022* (2013.01);
(Continued)

(58) Field of Classification Search
CPC . B62D 63/061; A63B 24/0021; A63B 71/022; A63B 69/3623; A63B 2024/0028;
(Continued)

(56) References Cited

U.S. PATENT DOCUMENTS 2,061,973 A    11/1936  Loeb
3,534,997 A  * 10/1970  Mitchell, Jr.  ......... B60P 3/0257
                                                      296/26.02
(Continued)

FOREIGN PATENT DOCUMENTS

JP    2011/019832    2/2011
KR    2016/0103694 A  9/2016

OTHER PUBLICATIONS https://www.trendhunter.com/trends/golf-simulator-on-tour (Year: 2007).*
(Continued)

*Primary Examiner* — Jeffrey S Vanderveen
(74) *Attorney, Agent, or Firm* — Smith Patent, LLC; Chalin A. Smith

(57) ABSTRACT

Herein disclosed is a mobile golf simulation system, more particularly, a double-bayed golf simulator apparatus mounted to a wheeled trailer that may be readily transported and deployed to remote, particularly outdoor locations. The mobile golf simulation system of the present invention is uniquely designed to include a projection system installed beneath a floating floor that, along with right and left drop-down walls, allows for the creation of an open air platform from which a user may play a realistic form of virtual golf, hitting his ball into a built-in screen.

22 Claims, 16 Drawing Sheets

Related U.S. Application Data

(60) Provisional application No. 63/128,982, filed on Dec. 22, 2020.

(51) Int. Cl.
  *A63B 69/36* (2006.01)
  *A63B 71/02* (2006.01)
  *A63B 71/06* (2006.01)

(52) U.S. Cl.
  CPC ... *A63B 2024/0028* (2013.01); *A63B 69/3623* (2013.01); *A63B 2071/0647* (2013.01); *A63B 2220/80* (2013.01); *A63B 2225/11* (2020.08); *A63B 2225/74* (2020.08)

(58) Field of Classification Search
  CPC ........ A63B 2071/0647; A63B 2220/80; A63B 2225/11; A63B 2225/74; A63B 2225/20; A63B 2225/50; A63B 69/3661; A63B 71/0622; B60P 3/025
  See application file for complete search history.

(56) References Cited

U.S. PATENT DOCUMENTS

| | | | |
|---|---|---|---|
| 3,559,996 | A | 2/1971 | Hopp |
| 3,778,064 | A | 12/1973 | Nutter |
| 4,086,630 | A | 4/1978 | Speiser et al. |
| 4,150,825 | A | 4/1979 | Wilson |
| 4,437,672 | A | 3/1984 | Armantrout et al. |
| 4,538,814 | A | 9/1985 | Cunningham |
| 5,056,791 | A | 10/1991 | Poillon et al. |
| 5,123,651 | A | 6/1992 | Vinciguerra |
| 5,248,180 | A | 9/1993 | Hussaini |
| 5,333,874 | A | 8/1994 | Arnold et al. |
| 5,354,063 | A | 10/1994 | Curchod |
| 5,390,927 | A | 2/1995 | Angelos |
| 5,718,639 | A | 2/1998 | Bouton |
| 5,846,139 | A | 12/1998 | Bair et al. |
| 6,595,863 | B2 | 7/2003 | Chamberlain et al. |
| 7,011,351 | B1 | 3/2006 | Crean |
| 8,085,188 | B2 | 12/2011 | Tuxen |
| 8,820,313 | B1 | 9/2014 | Lutes |
| 8,845,442 | B2 | 9/2014 | Tuxen |
| 9,147,296 | B2 | 9/2015 | Ricci |
| 9,333,820 | B2 | 5/2016 | Anabtawi |
| 9,857,459 | B2 | 1/2018 | Tuxen |
| 10,953,303 | B2 | 3/2021 | Tuxen |
| 10,989,791 | B2 | 4/2021 | Tuxen et al. |
| 11,124,253 | B1 * | 9/2021 | Yang .................... B60W 40/08 |
| 11,130,535 | B1 | 9/2021 | Yang et al. |
| 2007/0293331 | A1 | 12/2007 | Tuxen |
| 2011/0118040 | A1 | 5/2011 | Ashby et al. |
| 2014/0001786 | A1 | 1/2014 | Cantin |
| 2015/0224909 | A1 | 8/2015 | Cepynsky |
| 2016/0048975 | A9 | 2/2016 | Tuxen et al. |
| 2016/0347230 | A1 | 12/2016 | Pellicer |
| 2019/0166427 | A1 | 5/2019 | Mathiasen |
| 2019/0282854 | A1 | 9/2019 | Tuxen et al. |
| 2020/0017014 | A1 * | 1/2020 | Lopez ................... B60P 3/0257 |
| 2020/0317143 | A1 | 10/2020 | Goode |
| 2021/0349202 | A1 | 11/2021 | Tuxen |

OTHER PUBLICATIONS https://www.starterstory.com/stories/24-7-golf?successful_subscribe=true (Year: 2018).* https://golfsimulatorforum.com/forum/golf-simulator-forum/simulator-builds/241150-reducing-radar-reflections (Year: 2020).*

William Bonneux, "Dutch Golf on Tour", *Lifestyle*, Oct. 20, 2007, https://www.trendhunter.com/trends/golf-simulator-on-tour, accessed Mar. 30, 2022.

Golf Simulator Forum, Mar. 25, 2020, https://golfsimulatorforum.com/forum/golf-simulator-forum/simulators-builds/241150-reducing-radar-reflections, accessed Mar. 30, 2022.

Igor Vainshtien, "Growing a Business Selling Golf Simulators to $50K/month", *Starter Story*, Jun. 28, 2018, https://www.starterstory.com/stories/24-7-golf, accessed Mar. 30, 2022.

* cited by examiner

MOBILE GOLF SIMULATION SYSTEM

PRIORITY

This application is a continuation of U.S. patent application Ser. No. 17/558,273 filed Dec. 21, 2021, now U.S. Pat. No. 11,352,079 issued Jun. 7, 2022, which in turn claims the benefit of U.S. Provisional Application Ser. No. 63/128,982 filed Dec. 22, 2020, the contents of which are incorporated by reference herein in their entirety.

FIELD OF THE INVENTION

The present invention relates generally to a mobile golf simulation system. More particularly, the present invention relates to a convertible wheeled trailer assembly housing a double-bayed golf simulator that may be transported to and deployed at remote, particularly outdoor locations.

BACKGROUND OF THE INVENTION

In some golf simulators, a person using the simulator physically swings a physical golf club at a physical golf ball. One or more sensors are used to obtain information about the physical swing or "stroke", and the information is input into a computer system. The computer includes a computer program, such as a golf game, that uses the information to generate a virtual stroke and resulting virtual golf ball trajectory on a virtual golf course within the computer program. Thus, the golf simulator transduces the actual, physical golf stroke into a virtual golf stroke created within the computer system using information obtained from the actual, physical stroke performed by the person using the simulator.

Golf simulators used to simulate physical golf play in an at least partially virtual environment are well known in the art. See, for example, the following references, the contents of which are incorporated by reference in their entirety:

U.S. Pat. No. 4,086,630 issued Apr. 25, 1978 to Speiser et al.;
U.S. Pat. No. 4,150,825 issued Apr. 24, 1979 to Wilson;
U.S. Pat. No. 5,056,791 issued Oct. 15, 1991 to Poillon et al.;
U.S. Pat. No. 5,333,874 issued Aug. 2, 1994 to Arnold et al.;
U.S. Pat. No. 5,354,063 issued Oct. 11, 1994 to Curchod;
U.S. Pat. No. 5,390,927 issued Feb. 21, 1995 to Angelos;
U.S. Pat. No. 5,718,639 issued Feb. 17, 1998 to Bouton;
U.S. Pat. No. 5,846,139 issued Dec. 8, 1998 to Bair et al.;
U.S. Pat. No. 6,595,863 issued Jul. 22, 2003 to Chamberlain et al.;
U.S. Pat. Pub. No. 2011/0118040 published to Ashby et al. on May 19, 2011; and
Korean Pat. Pub. No. KR 2016/0103694 A published to Jang on Sep. 2, 2016.

More recently, mobile and portable golf simulation systems have been described. See, for example, the following references, the contents of which are incorporated by reference in their entirety:

Japanese Pat. Pub. No. JP 2011/019832 A published to Ohara on Feb. 3, 2011;
U.S. Pat. No. 11,124,253 issued Sep. 21, 2021 to Yang et al.; and
U.S. Pat. No. 11,130,535 issued Sep. 28, 2021 to Yang et al.

One disadvantage of existing golf simulation systems is most are restricted to indoor play. In addition, most are restricted to a discrete physical location, being both cumbersome to move and difficult to deploy at remote locations, particularly outdoor locations that lack power supply. The present invention addresses these drawbacks by providing a self-powered mobile golf simulation system, more particularly a convertible wheeled trailer assembly housing a double-bayed golf simulator that may be transported to and deployed at remote, particularly outdoor locations. In this manner, the present invention enables the feel of realistic outdoor golf play at virtually any site.

SUMMARY OF THE INVENTION

In view of the aforenoted need in the art, it is an objective of the present invention to provide a wheeled trailer system that may be opened on three of four sides to maximize the feel of realistic outdoor golf play. In a particularly preferred embodiment, the wheeled trailer system is composed of:
  a horizontal frame having at least one longitudinal support and at least one transverse axle that carries at least one wheel at each axle end; and
  a rectangular trailer box resting atop and attached to the horizontal frame that is characterized by front, rear, and opposed side panels capped with bottom and top panels forming the respective floor and ceiling of the trailer box,
  wherein:
  each side panel includes a horizontally hinged wall portion that may be unlocked from the remainder of the trailer box and laterally deployed to form a side platform; and
  at least a portion of the rear end panel includes a horizontally hinged rear ramp door that folds down to provide ready access to the trailer box interior.

Critically, and in contrast to the conventional simulators of the prior art, it is an objective of the present invention to include two open sides, more particularly left and right side player bays, that thereby allow two participants to play at once, either in a solo capacity, in competition or as part of a team. It is a further objective to include an open rear ramp allows the trailer to be ADA compliant and afford access to player with a wide range of abilities. However, providing a trailer of box-like construction with three open sides has a tendency to undermine the its stability and can lead to "racking", wherein the structural components are subjected to torsional forces and driven out of plumb. In the context of the present invention, to safeguard against to racking, the present invention optimally includes a series of reinforcing locks along the edges of the side panels. In a preferred embodiment, the locks are heavy duty spring-loaded latches arrayed about the top and sides of the horizontally hinged wall portion. In a particularly preferred embodiment, the locks engage automatically and provide tight structural security to the trailer construction.

As noted above, the present invention provides laterally opposed left and right side simulator bays that allow two participants to play at once. This dual-play is further effectuated by the inclusion of a partition wall that extends longitudinally through the middle of the trailer box. The partition wall effectively bisects the trailer interior into respective left and right side bays and serves as the mounting point for first and second impact screens, with the former attached to the left side of the partition wall and the latter attached to the right side of the partition wall. Each side bay contains its own golf simulation unit operably networked to a computer system that, in turn, controls respective left and right side projectors.

Since the right and left side screens and projectors are in close proximity, effectively back-to-back, the potential for video interference, wherein, for example, video from the left side projector transmits through the partition wall onto the right side screen, is high. Accordingly, it is an objective of the present invention to avoid disruption and optimize enable clarity by, for example, providing at least one layer of a radar-absorbing material over the partition wall and/or behind the respective screens.

As noted above, it is an objective of the present invention to provide a mobile golf simulation system characterized by lateral left and right side player bays. However, the movement inherent to the mobile nature of the present invention has a tendency to disrupt the delicate projection system associated with conventional golf simulation unit, disturbing both focus and connectivity, for example, particularly when mounted to the trailer ceiling (as is state of the art in most prior art systems). In addition, ceiling mounting of the projector tends to force the overall trailer height to exceed standard road and bridge limitations, thereby limiting the range and access of the simulator. As the relative distances between the play area, launch monitor(s), radar sensor(s), projector and screen tend to be closely dictated by the particular simulation system selected, adjustment options are highly constrained. Accordingly, it is yet another objective of the present invention to overcome the issues by mounting the projector below the play floor, more particularly in a basement compartment located between a bottom panel serving as the trailer box floor (herein, "subfloor") and a floating or false floor disposed above and parallel thereto. In a particularly preferred embodiment, the projector rests on isolation feet that act to minimize motion while trailer is in transit. Raising the floor in this manner also permits the materials to sit above the wheel well while maintaining an overall height that is within normal road clearance.

In yet a further preferred embodiment, the pair of deployable side platforms are provided with a padded turf stage and tee area on the top surface and a series of adjustable stage legs on the bottom surface, further wherein, when laterally deployed, the side platforms are level with the aforementioned floating or false floor. Each side bay may optionally further include a series of ball-capturing nets extending along the sides of said deployed platform and/or a collapsible sun shade pivotably attached to the top panel of the trailer box. In addition, as the deployable panels are quite large (e.g., on the order of 18 ft. W×9 ft. H) and heavy (generally over 1000+ lbs), it is preferable that deployment be automated and lowered by means of a motorized mechanism. This ensures rapid yet safe assembly and disassembly with only minimal manpower (e.g., 1-2 people) and minimal time (e.g., set up and take down time preferably 1 hour or less).

It is yet another objective of the present invention to provide for ready access to the various mechanisms and machinery required to run the mobile golf simulator of the present invention. Accordingly, in a particularly preferred embodiment, the wheeled trailer is provided with a side door that provides access to an interior forward compartment that houses the requisite electrical, electronic, and power components necessary to run said golf simulation units.

In order to maximize the realistic and interactive nature of the inventive simulator, it is desirable to include state of the art audio/visual equipment such as internal and/or external video monitors, cameras for recording and/or live-streaming, and surround sound stereo equipment. It is also desirable to include a variety of indoor and outdoor lighting to enable both night and day play.

The wheeled trailer system of the present invention is meant to be towed by another vehicle. Accordingly, it is an objective of the present invention to provide the wheeled trailer system, more particularly the front end of the horizontal frame, with a conventional tow hitch as well as at least one stabilizing jack.

These and other objectives and features of the invention will become more fully apparent when the following detailed description is read in conjunction with the accompanying figures and examples. However, it is to be understood that both the foregoing summary of the invention and the following detailed description are of a preferred embodiment, and not restrictive of the invention or other alternate embodiments of the invention. In particular, while the invention is described herein with reference to a number of specific embodiments, it will be appreciated that the description is illustrative of the invention and should not be construed as limiting of the invention. Various modifications and applications may occur to those who are skilled in the art, without departing from the spirit and the scope of the invention.

BRIEF DESCRIPTION OF THE DRAWINGS

Various aspects and applications of the present invention will become apparent to the skilled artisan upon consideration of the brief description of the figures and the detailed description of the present invention and its preferred embodiments which follows:

In FIG. 1, the wheeled trailer assembly is depicted in the closed configuration (i.e., "transport mode").

FIG. 4 depicts an illustrative internal floor plan for the trailer assembly.

DETAILED DESCRIPTION OF THE PREFERRED EMBODIMENTS

Figure 1:
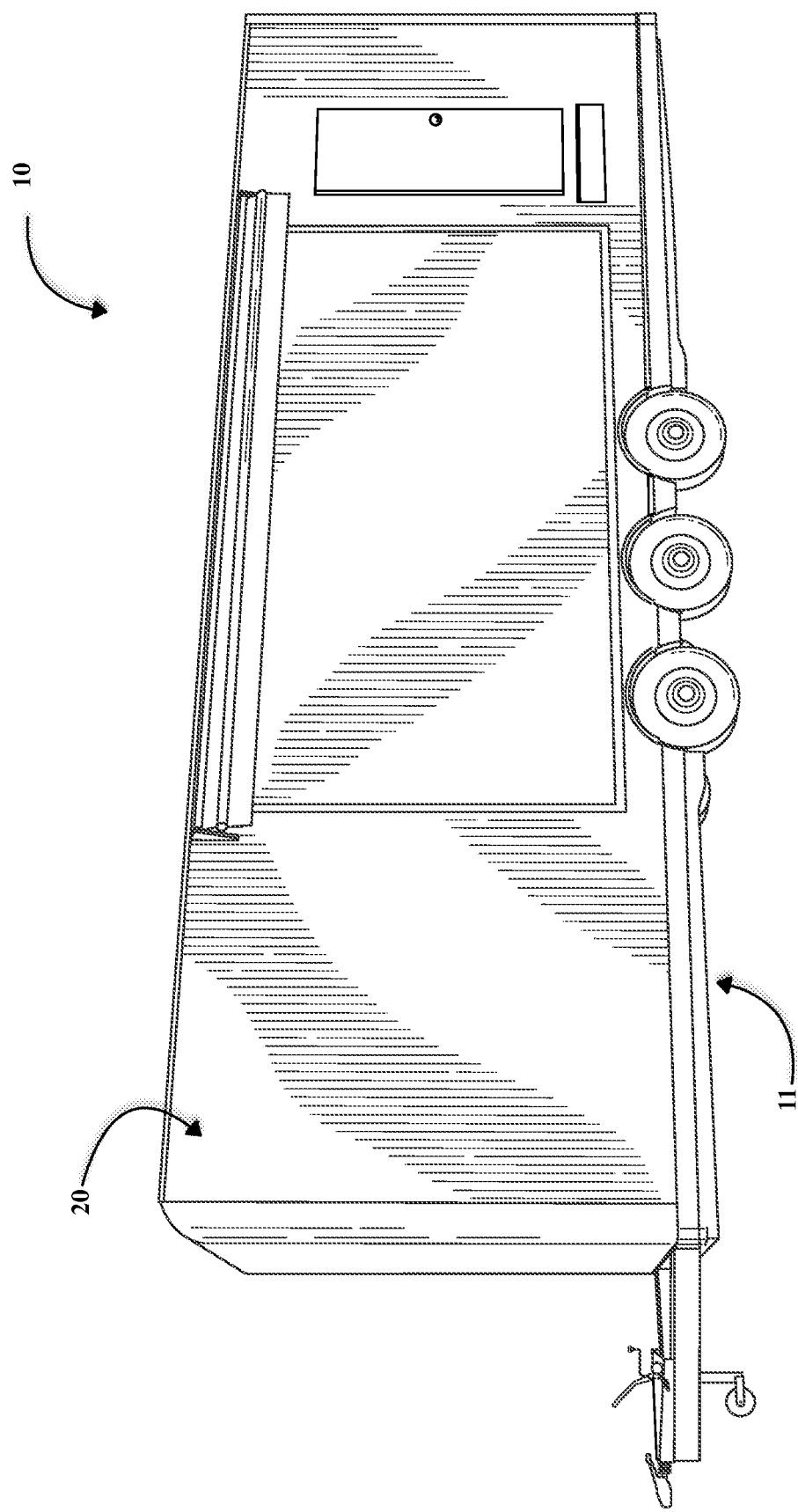
FIG. 1 presents a perspective view of an illustrative double bayed mobile golf simulation system of the present invention, including an exemplary wheeled trailer assembly designed in accordance with the dictates of the present invention.

The present invention is directed to double-bayed mobile golf simulator apparatus mounted to a wheeled trailer that may be readily transported and deployed to a remote, particularly outdoor location. The mobile golf simulation system of the present invention is uniquely designed to include a projection system installed beneath a floating floor that, along with right and left drop-down walls, allows for the creation of an open air platform from which a user may play a realistic form of virtual golf, hitting his ball into a built-in impact screen.

Although any methods and materials similar or equivalent to those described herein can be used in the practice or testing of embodiments of the present invention, the preferred methods, devices, and materials are now described. However, before the present materials and methods are described, it is to be understood that this invention is not limited to the particular dimensions, materials, methodologies and/or protocols herein described, as these may vary in accordance with routine experimentation and design optimization. It is also to be understood that the terminology used in the description is for the purpose of describing the particular versions or embodiments only, and is not intended to limit the scope of the present invention which will be limited only by the appended claims.

In describing the particularly preferred embodiments that follow, all publications, patent applications, patents and other references mentioned herein are incorporated by reference in their entirety. Likewise, unless otherwise defined, all technical and scientific terms used herein have the same meaning as commonly understood by one of ordinary skill in the art to which this invention belongs. In case of conflict, the present specification, including definitions, will control.

In the context of the present invention, the following definitions apply:

The words "a", "an", and "the" as used herein mean "at least one" unless otherwise specifically indicated.

The terms "front", "forward" and "proximal" are used interchangeably herein to refer to that end or portion of an apparatus or assembly which is situated closest to the user. Herein, the front, forward or proximal end of a wheeled trailer assembly crafted in accordance with the present invention is the end situated closest to the hauling vehicle that includes the towing assembly.

The terms "rear", "aft", and "distal" are used interchangeably herein to refer to that end or portion of an apparatus or assembly which is situated farthest away from the user. Herein, the rear, aft, or distal end of a wheeled trailer assembly crafted in accordance with the present invention is that end situated farthest away from the hauling vehicle that includes the hinged rear door.

The present invention makes reference a wheeled "frame" that serves as the undercarriage of the mobile golf simulation system of the present invention. In the context of the present invention, the frame takes the form a generally rectangular horizontal base fabricated from a durable metal such as aluminum or steel. The front end of the frame preferably includes standard towing components that facilitate connection to a hauling vehicle. To that end, the present invention contemplates the inclusion of a conventional tow hitch, such as a 54-inch triple tongue tube or 60-inch extended tongue tube hitch, as well as a 7000-8000 lb. hydraulic tongue or drop leg jack. The 60-inch extended tongue tube embodiment tends to maximize turn radius and prevent jackknifing and thus is particularly preferred.

In the context of the present invention, the frame is composed of at least one, preferably two or three longitudinal supports assembled together by means of at least one transverse axle that itself carries a single wheel at each respective axle end. The present invention contemplates 1-4 axles (i.e., 2-8 wheels), preferably 2-3 axles (i.e., 4-6 wheels). The axles may be present as independent or tandem axles. Alternatively, the frame may be supported by one or more bogies (alt. "bogey"), preferably a set of 2-3 bogies (i.e., 4-6 wheels).

In the context of the present invention, the terms "bogie" and "bogey" are used interchangeably to refer to a modular subassembly of wheels and axles, such as a chassis or framework that carries a wheelset. Herein, the bogie may remain normally attached to the frame or, alternatively, may be quickly detachable. It may contain a suspension within it or may be solid and in turn suspended. It may be mounted on a swivel, additionally jointed and sprung, or held in place by other means (e.g., centerless bogies).

The present invention makes reference to a rectangular "trailer box". In the context of the present invention, the rectangular trailer box resting atop and attached to the horizontal frame is characterized by front, rear, and opposed side panels capped with bottom and top panels forming the respective floor and ceiling of the trailer box.

The dimensions of the trailer box and wheeled base are largely a matter of design choice. However, certain issues arise when the trailer is "oversized", i.e., too tall or wide for most roads and highways. Accordingly, in the context of the present invention, the length of the trailer box and wheeled base is preferably on the order of 32-40 feet, more preferably 32-36 feet, more preferably 32-34 feet. Likewise, a trailer base and trailer box designed in accordance with the present invention has an average overall width on the order of 8-10 feet, preferably between 8 and 8.5 feet, and an overall height of less than 13-13.5 feet (with the trailer box per se being on the order of 9-10 feet high).

The exterior walls of the trailer box are optionally formed from sheets aluminum attached using either the screwed or screwless (semi-screwless) methods, for example using VHB 0.050 tape from 3M. Screwless exterior trailers have advantages over screwed trailers. For example, screwless trailers look smooth and provide a nice flat surface for decals and wraps, since there are no screws heads that create humps in the vinyl. Another big advantage over a screwed exterior is that the aluminum sheets are installed so that they can expand and contract with temperature changes. This greatly reduces wrinkles, especially noticeable on darker colors. In contrast, screwed exteriors cannot expand or contract. As a result, the screws often cause the aluminum sheets to spider crack around the screw head. Since trailers vibrate while being towed down the road, vibration also causes the exterior to crack or split, especially over time. These cracks often create openings and allow water to seep into the trailer. The holes will continue to expand and cause the sheeting to become loose. In high temperatures, screwed exteriors can wrinkle very badly, especially black and other dark colors. However, regardless of which fabrication method is used, it is important that each aluminum sheet overlaps the adjacent sheet. The first sheet gets installed at the back of the trailer so that each new sheet can overlap the one that was previously installed. The seams will all face backward so that the wind cannot get under the sheets and cause problems.

In the context of the present invention, the trailer exterior is characterized by a pair of opposed lateral panels, each of which is provided with a horizontally hinged wall portion or "stage door" that may be unlocked from the remainder of said trailer box and laterally deployed to form a side platform that is level with an interior floating floor and includes a padded turf stage and central action area ("tee box") on its top surface and a series of adjustable stage legs on its bottom surface. The "stage door" is quite large, heavy, and bulky, on the order of 18 ft. W×9 ft. H and over 1000 lbs. Accordingly, deployment is preferably automated, by means of a motorized mechanism, for example by means of a pair of winches optionally disposed in the ceiling of the trailer. To that end, a preferred deployment means is a 12 volt, 1500 lb, 10-feet wired remote ceiling mount winch that includes a winch plate, additional supporting roof bows, an exterior plug for wired remote lowering the "stage doors" by means of a series of D-ring connectors disposed thereon. Such a motorized mechanism ensures rapid yet safe assembly and disassembly with only minimal manpower (e.g., 1-2 people) and minimal time (e.g., set up and take down time preferably 1 hour or less).

As noted above, the top surface of each side platform is preferably covered in a padded artificial turf (such as Astro-Turf) and serves as stage and tee area whereas the bottom surface is provided with a series of 4-8, more preferably 4-6 stage legs, ideally 5 stage legs. Each stage legs is independently adjustable to allow for stable, steady, relatively planar positioning of the side platform, flush with the effective floor of the trailer, particularly when deployed over uneven surfaces. In the context of the present invention, each side platform may be optionally outfitted with a set of stairs and guardrail fencing to prevent participants from accidentally stepping off the platform. Such guardrail fencing preferably extends at least along the back edge of the platform, though full perimeter fencing is also contemplated. Likewise, while in a preferred embodiment, the stairs comprise a collapsible component that may be separately attached to the platform, optionally via pre-set or quick-click mounting rigged to the platform, other configurations are contemplated. For example, the stairs may be exchanged for a ramp so as to allow direct access to disabled participants.

In the context of the present invention, the trailer exterior is further characterized by a rear end panel, at least a portion of which comprises a horizontally hinged rear door that folds down to provide ready access to said trailer box interior. In the context of the present invention, this rear door preferably takes the form of a 92-inch wide heavy duty rear ramp door provided with an aluminum hinge, a 48 inch×1 inch aluminum flap, and a rubber hinge cover. In an alternate embodiment, the hinged rear door may include a set of retractable stairs. In either case, the ramp or the stair set is preferably equipped with additional safety railing so as to ensure OSHA and ADA compliance.

As noted previously, providing a trailer of box-like construction with three open sides has a tendency to undermine the its stability and can lead to "racking", wherein the structural components are torqued and forced out of plumb. In the context of the present invention, to safeguard against racking, the present invention optimally includes a series of reinforcing locks deployed about the top and sides of each side platform. In a particularly preferred embodiment, the locks take the form of lever-controlled compression or spring-loaded door latches, optimally at least one lock per vertical side that is operably connected to a series of, e.g., 1-5, preferably 2-4, more preferably about 3, automated spring locks arrayed along the horizontal top edge that automatically release when the side latches are unlocked.

In the context of the present invention, the trailer exterior may optionally further include a single side door, optionally on the order of 48 inches wide×72 inches high, positioned on either the right or left side of the trailer exterior, between one of the stage doors and the front end of the trailer box. To ensure safe ingress and egress, the trailer exterior further includes a shallow aluminum stationary or slide out step, preferably on the order of 42 inches, centered below the side door.

In the context of the present invention, the trailer interior is characterized by a forward storage cabin, an aft access area, and a middle portion characterized by a floating floor that is disposed above and parallel to the bottom panel and that forms therewith a central basement compartment. In a preferred embodiment, the middle portion is effectively bisected into right and left side bays by a longitudinal partition wall arrayed on top of the floating floor. The partition wall preferably extends the full height of the trailer interior, from the floating floor to the ceiling, and is on the order of 18 ft. long by 2.25 inches thick.

The present invention makes reference to right and left side player "bays". In the context of the present invention, each bay is composed of the area disposed between the central partition wall and the outer edge of the deployed side platform. When the side platforms are deployed, the dimensions of each "side bay" are on the order of the >10 ft. wide×16 ft. 5 inches-19 ft. deep×>9 ft. 10 inches high. Each side bay may optionally further include a series of ball-capturing nets extending along the sides of the deployed platform and/or a collapsible sun shade pivotably attached to the top panel of the trailer box.

The present invention makes reference to independent "golf simulation units" provided on or in each side bay. In the context of the present invention, the phrase "golf simulation unit" encompasses combination launch monitor and simulator tracking systems that transduce an actual, physical golf stroke into a virtual golf stroke created within the computer system using information obtained from the actual, physical stroke performed by the person using the simulator. Critically, the present invention is not limited to any particular simulation hardware and software and thus may incorporate any number of golf simulation units as is conventional in the art.

Examples of commercially available launch monitors and simulator tracking systems include, but are not limited to, SkyTrak™ (www.skytrakgolf.com), GC Quad (www.foresightsports.com), Ernest Sports© (www.ernestsports.com), and TrackMan™ (https://trackmangolf.com). Each system offers a range of real-time ball and club data selected from among, but not limited to, club head speed, smash factor, angle of attack, club path, ball speed, horizontal and vertical launch angles, spin, side spin, and calculated carry distance. To that end, different software solutions are compatible with different launch monitors and simulator tracking systems, with each offering different features and game modes. Some popular examples include, but are not limited to: The Golf Club (TGC) (www.thegolfclubsimulator.com); E6 CONNECT (www.e6golf.com); QED Refine (www.qedsim.com); FSX By Foresight Sports (www.foresightsports.com); Jack Nicklaus Perfect Golf from SkyGolf (https://web.skygolf.com); ProTee Golf 2.0 (www.protee-united.com); and WGT Golf (www.wgt.com).

In a preferred embodiment, the present invention utilizes systems developed by Fredrik Tuxen and assigned to Track-Man A/S, examples of which include U.S. Pat. Nos. 8,085,188 B2; 8,845,442 B2; 9,857,459 B2; 10,953,303 B2; and 10,989,791 B2 and U.S. Patent Publication Nos. 2007/0293331 A1; 2016/0048975; 2019/0282854; and 2021/0349202, the contents of which are hereby incorporated by reference in their entirety. Such systems are designed to monitor and record a wide range of club data (e.g., Club Speed, Attack Angle, Dynamic Loft, Club Path, Face Angle, Face to Path, Spin Loft, Swing Plane, Swing Direction, Low Point, Impact Height, Impact Offset, Dynamic Lie); ball data (e.g., Ball Speed, Smash Factor, Launch Angle, Spin Rate, Launch Direction, Spin Axis, Height, Curve, Landing Angle, Carry, Side, Total, Side Total); and putting data (Club Speed, Backswing Time, Stroke Length, Forward Swing Time, Tempo, Dynamic Lie, Launch Direction, Ball Speed, Skid Distance, Roll Speed, Speed Drop, Roll %, Effective Stimpmeter, Side, Break, Distance, Attack Angle, Club Path, Face Angle, Face to Path, Entry Speed Distance, Elevation, Slope %, Slope % Rise, Stimp (Flat)) and thus provide an experience as close to "real" golf as possible.

Illustrative components of and specifications for commercially available "Trackman™" systems are described at https://www.trackman.com/golf/simulator/tech-specs and include, for example:

dual radar technology, namely two optically enhanced radar tracking sensors synchronized in time and space to provide both (a) short range, high-resolution system, focused on putting, club and impact data, and (b) a long range, high accuracy ball tracking system;

simulator software marketed under the brand "Virtual Golf 2";

a built in radar-synchronized camera with high dynamic range (HD 720p, Full HD 1080p);

an internal computer processor such as the Intel Baytrail Quad Core 1.9 GHz; and micro-USB and ethernet interfaces.

The above specifications suggest certain dimensional configurations for optimal simulation. For example, it is recommended that the "Trackman 4" radar kit, a box-like sensor unit on the order of 11.8 inches×11.8 inches×1.8 inches that weighs approximately 6.2 lbs, be placed a minimum of 6 ft., preferably 7 ft., more preferably 9 ft., with a preferred maximum of 10 ft. 15.4 feet (approximately 4.7 m) from the ball/tee and a minimum of 15.4 ft (approximately 4.7 m) from the associated side nets. Likewise, for optimal performance, the simulator specifications set a minimum room requirement at 10 ft. (3.0 m) wide×9.8 ft. (3.0 m) high×16.4 ft. (4.9 m) deep, a recommended wall-to-wall room depth of >19 ft. (>5.8 m), and a distance from ball to screen at greater than 7.5 ft. (2.3 m), preferably about 10 ft. (>3 m). The dimensions of the respective side bays in accordance with the present invention are herein designed with these dimensions in mind.

The present invention makes reference to a computer system networked to the respective golf simulation units. The computer system may take the form of one or more desktop or laptop machines. For optimal performance, such machines should meet the requisite recommended processor speed (generally 1.6-3.4 GHz, more preferably at least 2.5 GHz), data storage (e.g., 512 GB-1 TB), memory capacity (e.g., 8-16 GB RAM), and graphics handling (e.g., Nvidia 1070 8 GB GDDR, Nvidia RTX 2060 with 6 GB, or Nvidia RTX with 8 GB).

The present invention further contemplates the inclusion of additional audio and video input and output devices that likewise may be operably connected and/or networked with the aforenoted computer system networked to the respective golf simulation units. For example, the present invention contemplates the inclusion of one or more video-capturing cameras for recording and/or streaming player activity and/or simulation results. The present invention likewise contemplates the inclusion of internal and/or externally mounted TV monitors for viewing of live or recorded materials, ranging from player video to simulation results to pre-recorded advertising and/or training videos. In addition, the present invention contemplates the inclusion of various surround sound stereo equipment that, again, may be used to broadcast local activity, live streams or pre-recorded music or messages.

The present invention makes reference to left and right side projectors operably connected to the aforenoted computer system and golf simulation units. For optimal performance, the projectors should be capable of a brightness of >5,000 ANSI lumens and an aspect ratio of 16:9 or 16:10. This will ensure a picture size of at least 100 inches that works well even with high levels of ambient light, providing vivid images both indoors and outdoors, thereby making it ideal for the outdoor and day/night uses contemplated by the present invention.

In the context of the present invention, the respective projectors preferably rest on isolation feet that are positioned within dedicated housing disposed within the basement compartment present between the exterior bottom panel and an interior false or floating floor, which preferably sits about 13 inches above the bottom panel. However the dimensions of the floating floor and basement compartment may be readily adjusted to accommodate additional and/or larger components, so long as the interior and overall heights remain with functional limits (e.g., minimum 6-8 feet on the inside, maximum 13-14 feet overall) By securing the projectors within dedicated subfloor housing, the present inventors are able to minimize any disturbance to focus and connectivity that may arise during trailer movement. In addition, by placing the projectors below the effective "floor", the present inventors were able to optimize the dimensional configuration of the side bays while keeping the overall height of the trailer below the maximum dictated by most state and federal road regulations. To wit, while there is no Federal vehicle height requirement for commercial vehicles, most states set height limits at 13 feet, 6 inches (4.11 meters) to 14 feet (4.27 meters). Likewise, the Federal Highway Authority (FHA) sets bridge clearances at 14-16 feet. Accordingly, the overall height of the double-bayed mobile golf simulation system is preferably less than 14 feet, more preferably about 13 feet.

The present invention makes reference to a pair of projector screens, more particularly right and left golf simulator impact screens, mounted to each side of the partition wall. In the context of the present invention, each screen is approximately 14-15 ft. wide×10-10.5 ft. high and is positioned a minimum of 10 ft., ideally 11 ft. away from the ball/virtual tee box. To avoid the passage of video signals from said right to said left screen, and vice versa, the partition wall is preferably clad, covered, or painted with a radar absorbing material to shield against unwanted transmission. Examples of such materials include, but are not limited to, metals such as iron and copper, thermoplastic polymers such polypropylene (PP), polybutylene terephthalate (PBT), polycarbonate (PC) with different reinforcements, and soft, thermoplastic elastomers such as Hytrel®

TPC-ET thermoplastic elastomer from DuPont™. Additional radar shielding materials are described at https://www.solianiemc.com/en/cp/radar-ab sorbent-materials.

In the context of the present invention, the trailer interior may be finished to include:
- a screwless, aluminum ceiling;
- a 0.030 aluminum and/or carpeted walls;
- polymer and/or flexfoil insulated walls and ceiling;
- built-in cabinetry and multiple electrical outlets, preferably 110 volt sockets for powering the radar unit, projector, computer, etc.;
- dedicated metal or wood compartments for the various electrical, electronic and/or power components;
- Wi-Fi and ethernet components, particularly ethernet networking the radar sensor to the computer and projection system;
- black coin vinyl flooring;
- an aluminum underbelly with thermoply backer.

The present invention further contemplates the inclusion of a variety of indoor and outdoor lighting, from overhead track and task lights to surface mounted scene and strip lights to 12V exterior flood lights. Likewise, both the interior and the exterior may optionally be covered with aluminum tread plate (ATP) stone guard wrapping. ATP comes in rolls and can be used to cover the floor, walls, and outside areas of a trailer. While it generally has a diamond like pattern, patterns can differ depending on brand. It is normally glued down when applied to the inside walls or floors but attached with screws when used on the exterior of the trailer On the outside, it is typically used as a stone guard around the bottom portions of the trailer where rocks and other debris might fly up and cause damage to the trailer exterior. These areas are along the bottom sides and front lower areas but it can be used most anywhere.

Hereinafter, the present invention is described in more detail by reference to the enclosed Figures and following Examples. However, the following materials, methods and examples only illustrate aspects of the invention and in no way are intended to limit the scope of the present invention. As such, methods and materials similar or equivalent to those described herein can be used in the practice or testing of the present invention.

EXAMPLES

Figure 2:
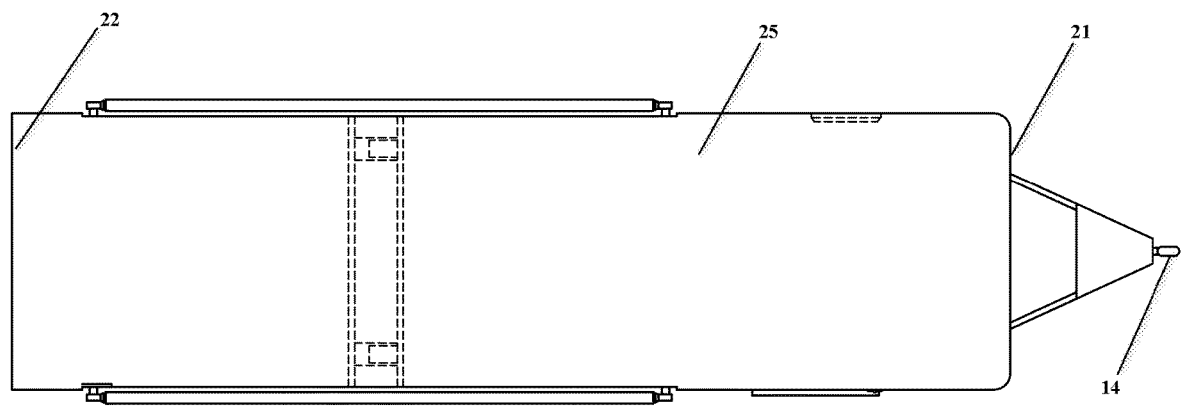
FIG. 2 presents a top plan view of the mobile golf simulation system of FIG. 1.
Figure 3:
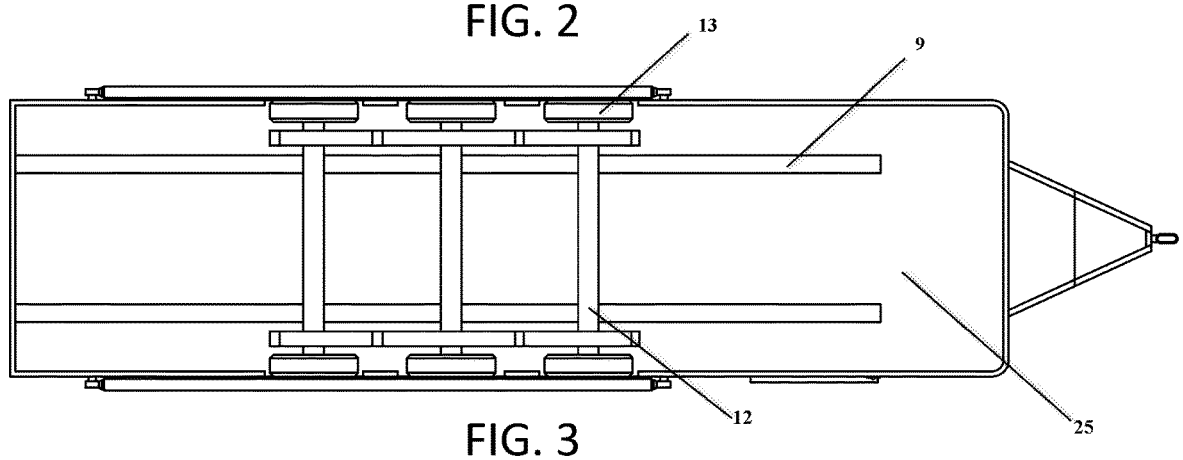
FIG. 3 presents a bottom plan view of the mobile golf simulation system of FIG. 1.

A double-bayed mobile golf simulation system illustrative of the present invention is depicted in FIGS. 1-17. To wit, FIGS. 1-17 present an exemplary wheeled trailer assembly designed in accordance with the dictates of the present invention. More particularly, FIG. 1 depicts a trailer assembly (10) composed of a wheeled horizontal frame (11) and a relatively rectangular trailer "box" (20), wherein the trailer "box" is in a closed configuration suitable for transport (i.e., "transport mode"). FIGS. 2-5 present additional views of the trailer assembly in transport mode. For example, FIGS. 2 and 3 present top and bottom plan views, respectively, that include depiction of:
- the front and rear end panels (21, 22); horizontal top and bottom panels (25), and left and right side panels (23) that make up the trailer box (20); and
- one or more wheels (13), transverse axles (12), longitudinal supports (9), and proximal tow hitch (14) that make up the wheeled horizontal frame (11).

Figure 4:
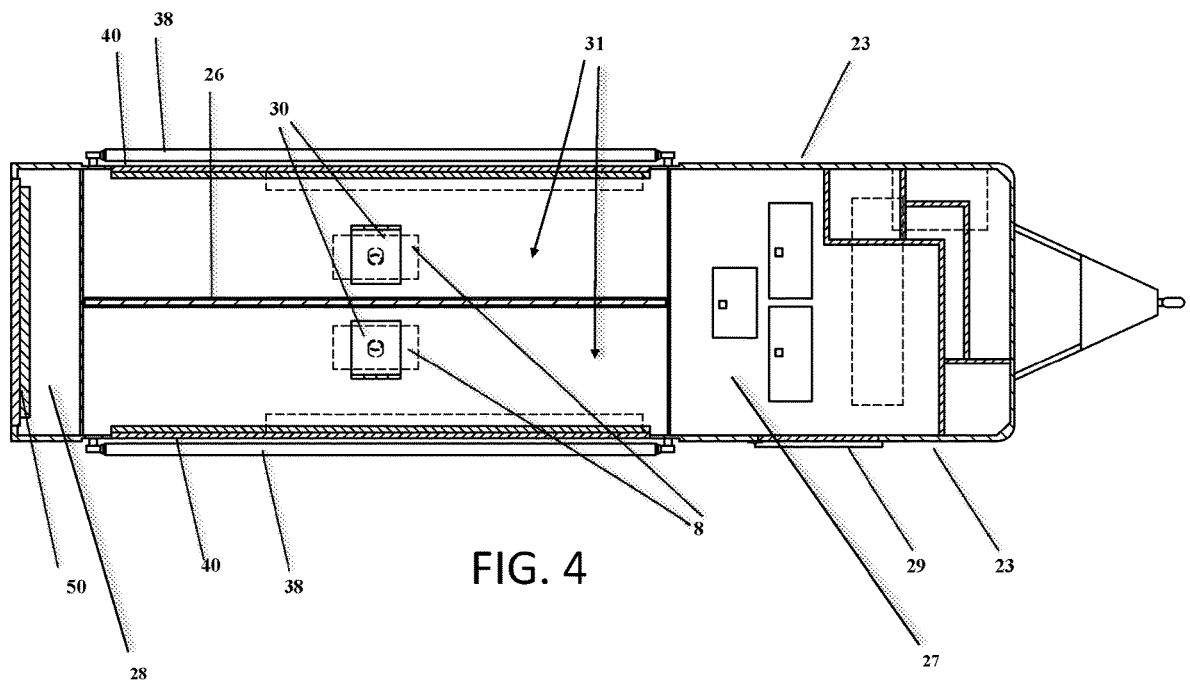
FIG. 4 presents a top sectional view of the mobile golf simulation system of FIG. 1.
Figure 5:
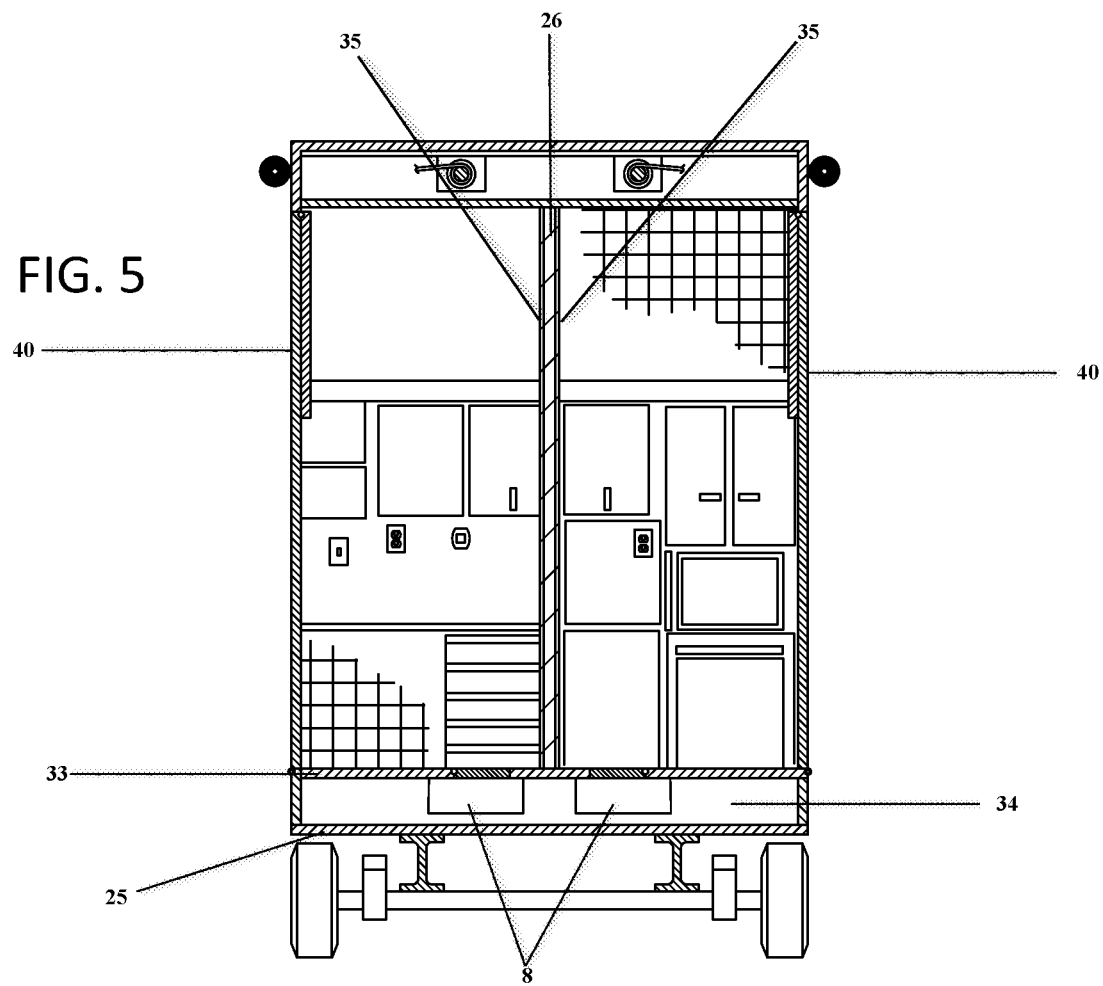
FIG. 5 presents a transverse sectional view through the middle of the mobile golf simulation system of FIG. 1.

FIG. 4 presents a top sectional view that reveals a preferred layout for the trailer interior, including elements such as:
- a central partition wall (26) that effectively bisects the trailer interior into right and left side bays (31);
- right and left side projectors (8) situated in a basement compartment (34) disposed beneath a floating floor (33) that is accessible via opposed hinged hatches (30);
- horizontally-hinged wall portions retained in their locked configuration by means of a series of compression bar locks that may be automatically controlled so as to enable smooth lateral deployment of such wall portions ("stage doors") to form right and left side platforms (40);
- right and left side sunshades (38) in their furled configuration that may be laterally deployed to extend over the right and left side platforms;
- a side door (29) that allows entry into the front end interior (27) and thereby access to various power and electrical components as well as computer and audio/visual equipment (not pictured);
- a hinged rear door (50) that allows entry into the rear end interior (28) as well as ADA access to the respective left and right side platforms when deployed. In a similar fashion, FIG. 5 presents a transverse sectional view through the middle of the mobile golf simulation system of FIG. 1 that reveals the arrangement of right and left side screens (35) on opposite sides of the partition wall (26) as well as right and left side projectors (8) in a basement compartment (34) underneath the floating floor (33).

Figure 6:
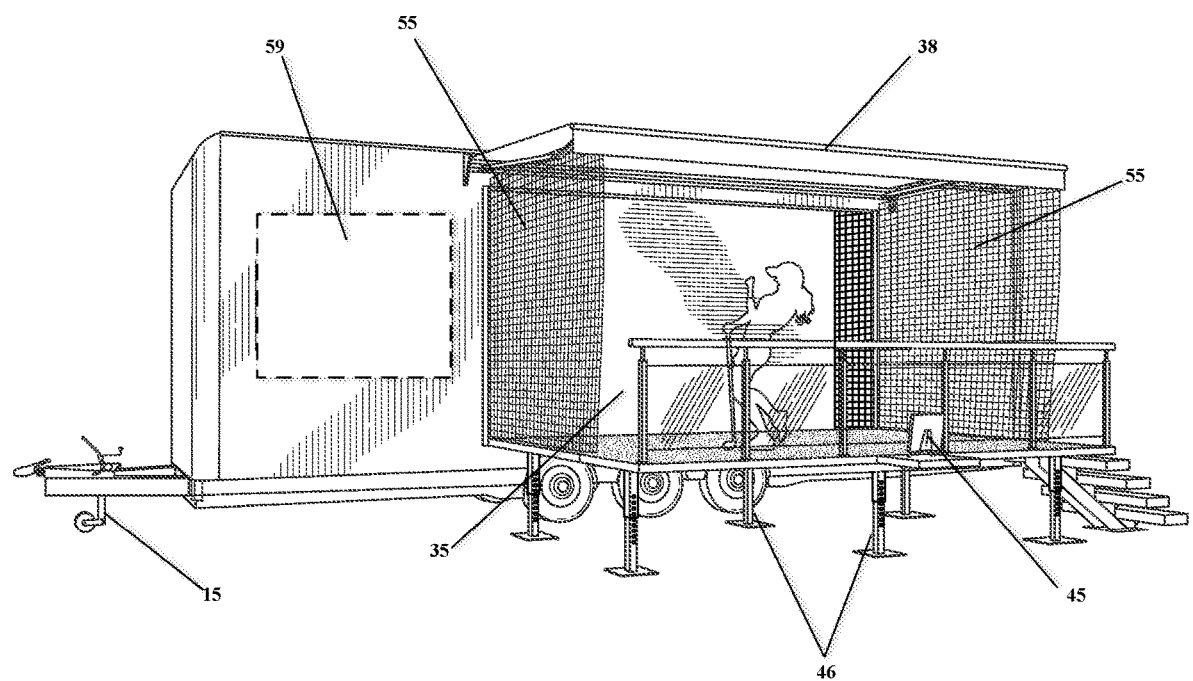
FIG. 6 presents a perspective view of the illustrative double bayed mobile golf simulation system of FIG. 1, wherein the wheeled trailer assembly is depicted in the partially open configuration (i.e., "one player mode").
Figure 7:
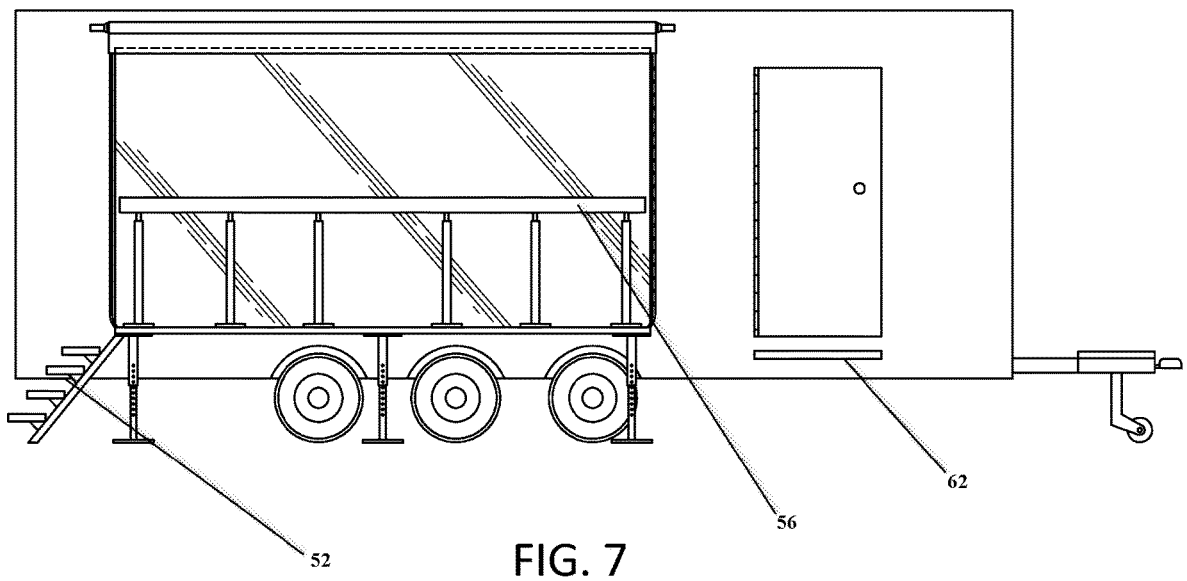
FIG. 7 presents a side elevation view of the mobile golf simulation system of FIG. 6.
Figure 8:
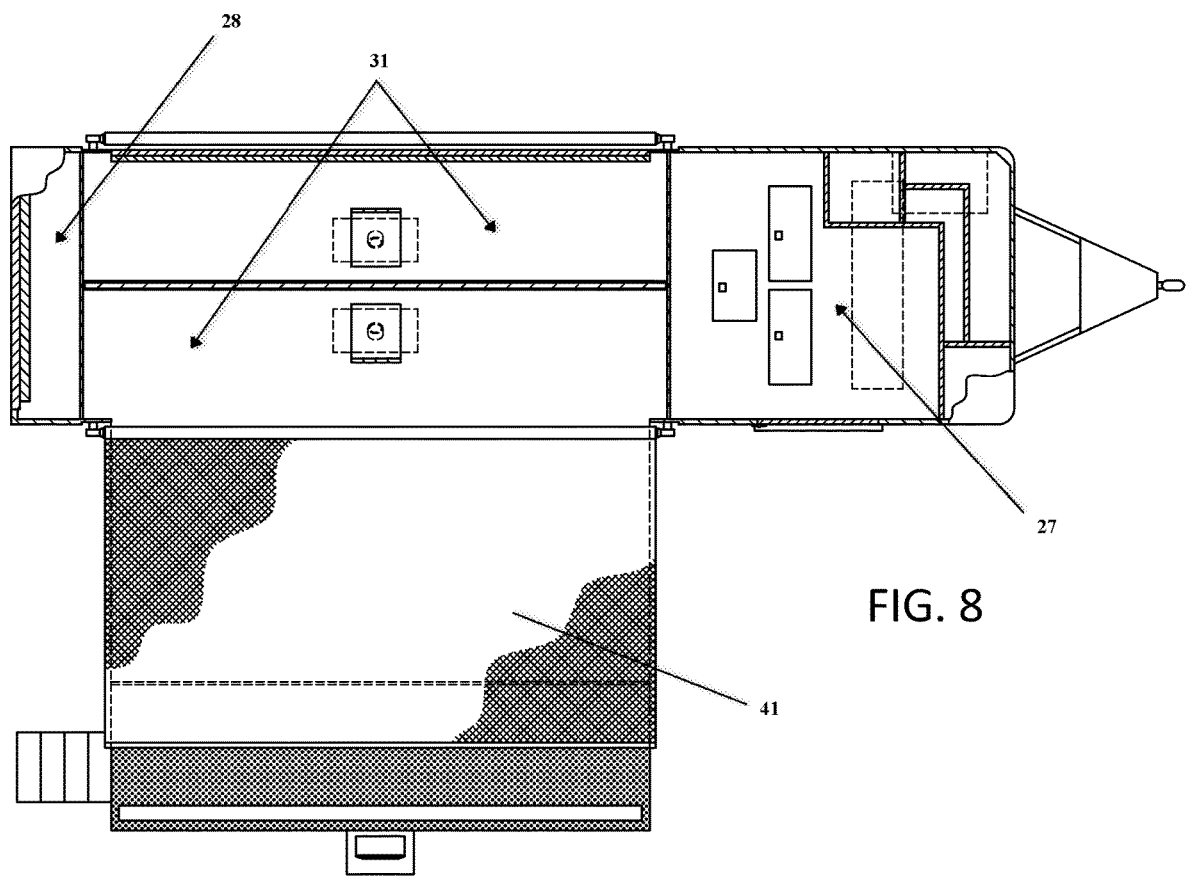
FIG. 8 presents a top sectional view of the mobile golf simulation system of FIG. 6.
Figure 9:
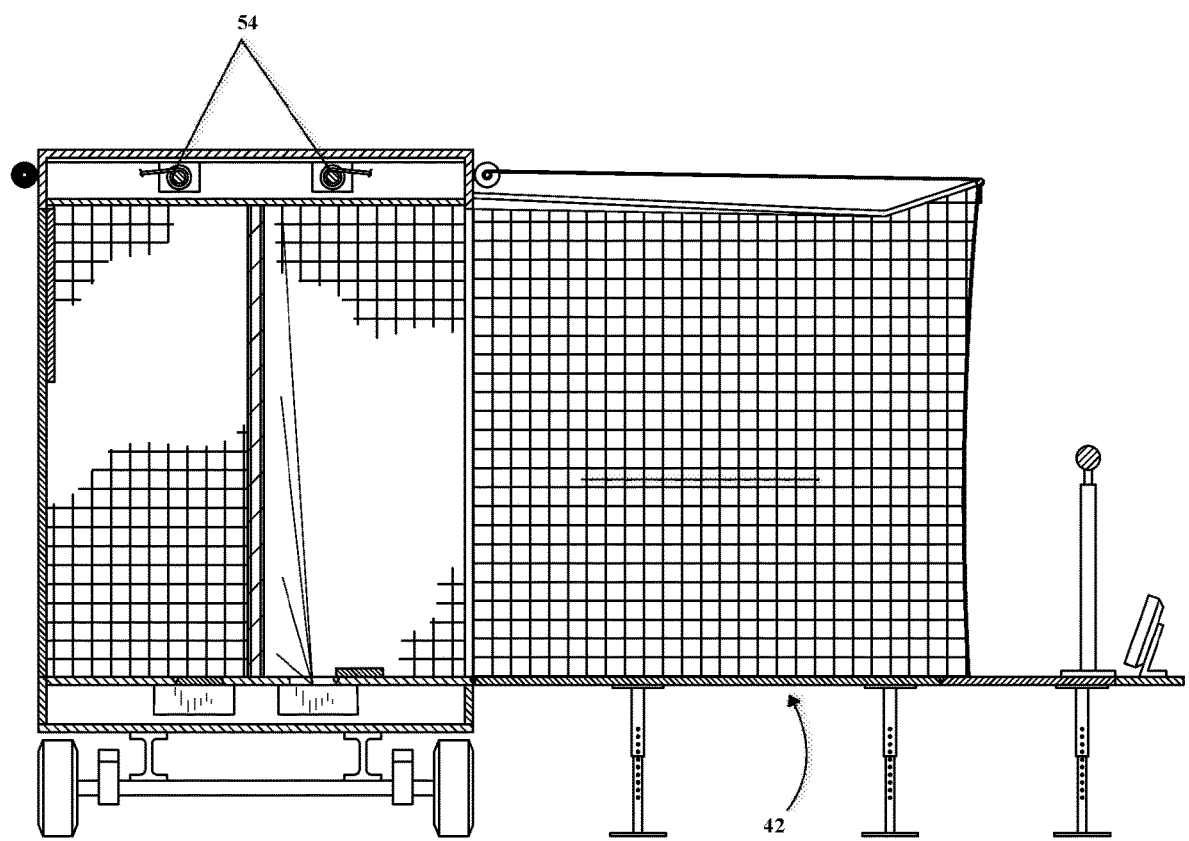
FIG. 9 presents a transverse sectional view of the mobile golf simulation system of FIG. 6.

FIG. 6 presents a perspective view of the trailer assembly (10) of FIG. 1 in "one player mode", wherein the trailer box is depicted in a partially open configuration. FIGS. 7-9 present additional views of the trailer assembly in one-player mode. To wit, FIG. 6 presents a perspective view of the illustrative double bayed mobile golf simulation system of FIG. 1, wherein the lateral platform (40), ball-capturing side nets (55) and overhanging sunshade (38) are depicted in their deployed positions. The top surface (41) of the platform may be optionally provided with a padded turf overlay (43) while the bottom surface (42) is outfitted with a number of adjustable legs (46) that ensure a stable, even playing surface. In addition, FIG. 6 depicts the requisite component(s) of the golf simulation unit, such as a Trackman radar kit, attached an outer edge of the platform. FIG. 6 further depicts an optional but nevertheless preferred leveling jack (15) assembled to the proximal tow hitch assembly. Finally, FIG. 6 depicts the inclusion of an optional exterior monitor (59) that facilitates airing of live-streaming and/or recorded materials to both the designated participants and audience members. Additional details, such as the platform access stairs (52), the platform guardrail (56), the ceiling mounted winches (54), and slide-out side door step (62), are highlighted in the views of FIGS. 7-9.

Figure 10:
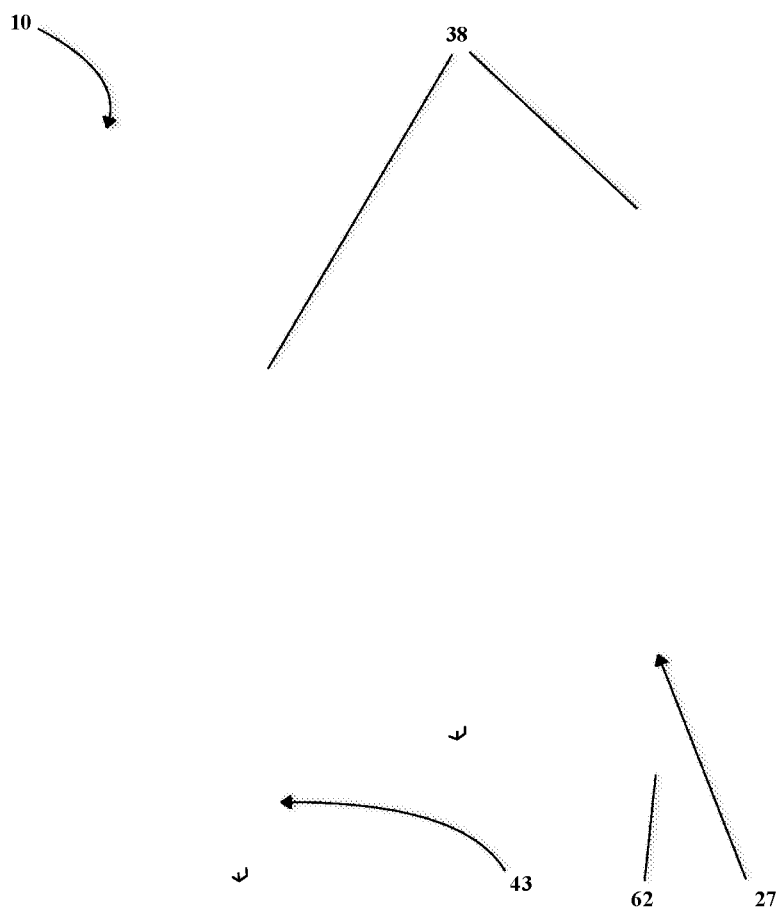
FIG. 10 presents a perspective view of the illustrative double bayed mobile golf simulation system of FIG. 1, wherein the wheeled trailer assembly is depicted in the open two-sided configuration (i.e., "two player mode").
Figure 11:
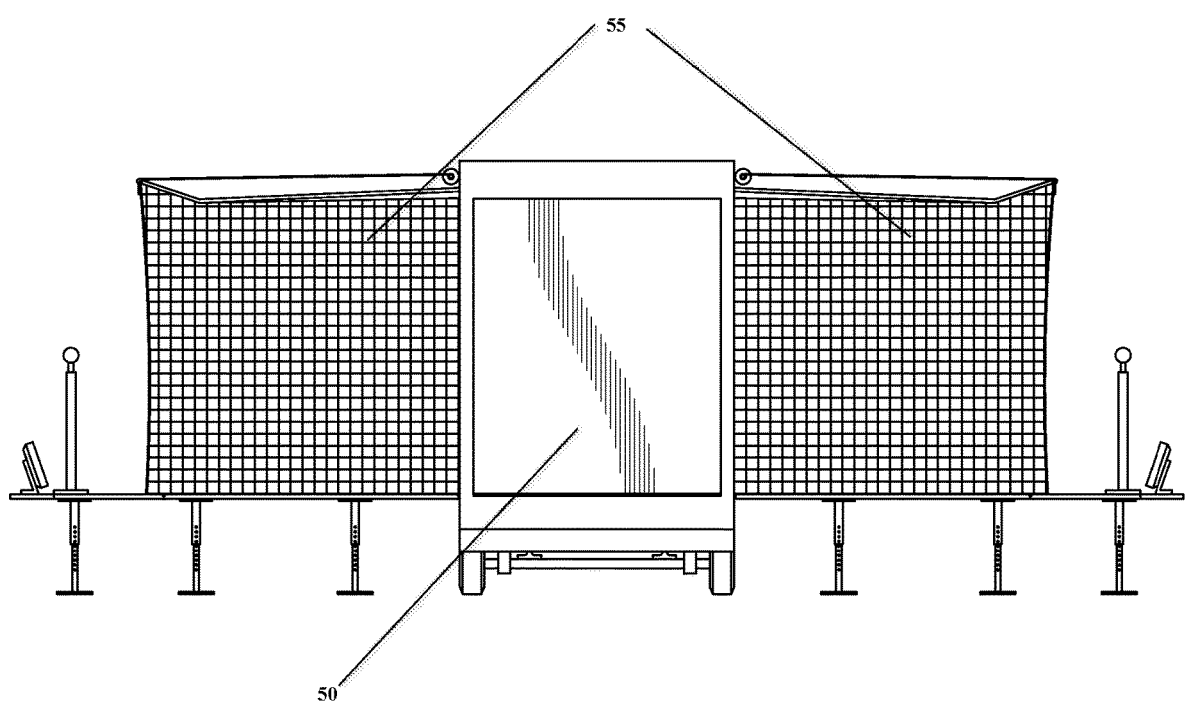
FIG. 11 presents an end elevation view of the mobile golf simulation system of FIG. 10.
Figure 12:
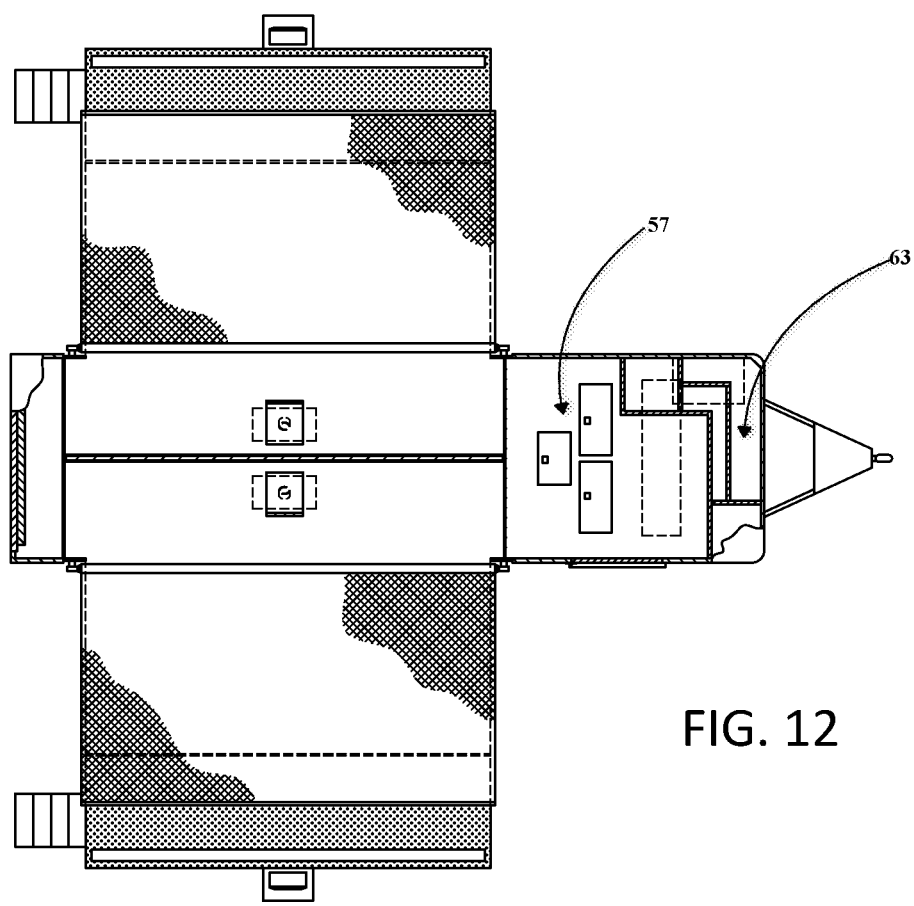
FIG. 12 presents a top sectional view of the mobile golf simulation system of FIG. 10.
Figure 13:
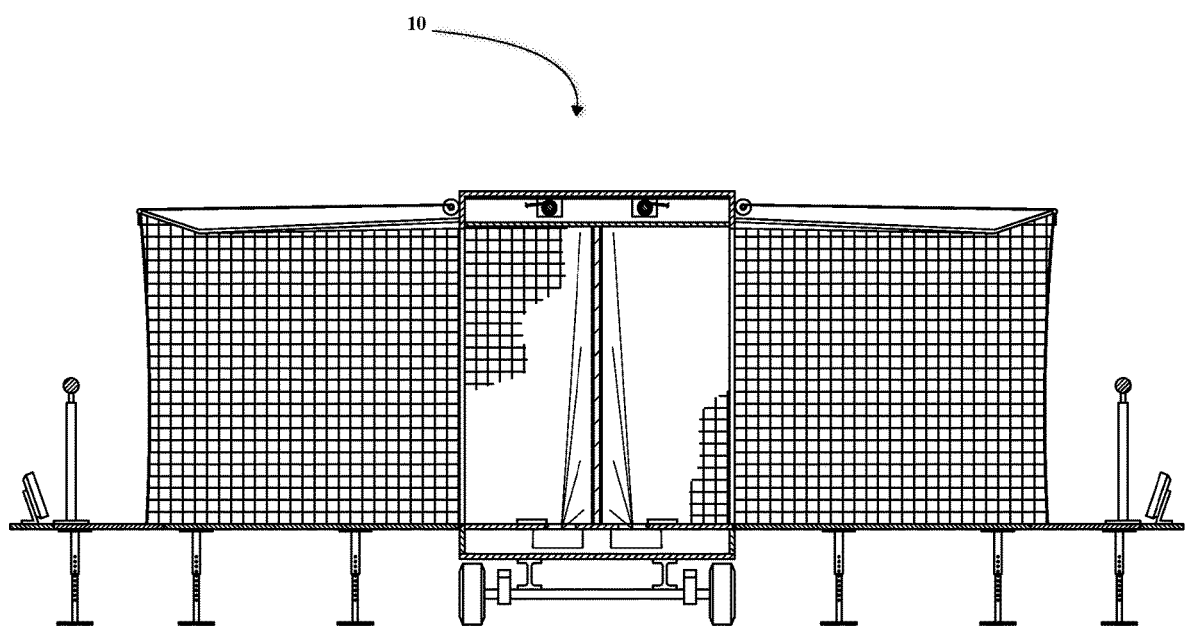
FIG. 13 presents a transverse sectional view of the mobile golf simulation system of FIG. 10.

FIG. 10 presents a perspective view of the trailer assembly (10) of FIG. 1 in "two player mode", wherein the trailer box is depicted with both side platforms in their deployed/open configuration. FIGS. 11-13 present additional views of the trailer assembly in two-player mode. To wit, FIG. 10 presents a perspective view of the illustrative double bayed mobile golf simulation system of FIG. 1, wherein both left and right side sets of lateral platform (40), overhanging sunshade (38), and ball-capturing side nets (55) are depicted in their fully deployed positions. As noted above, the top surface (41) of the platform may be optionally provided with a padded turf overlay (43) while the bottom surface (42) is outfitted with a number of adjustable legs (46) that ensure a stable, even playing surface. Likewise, the requisite component(s) of the golf simulation unit, such as a Trackman radar kit, may be attached an outer edge of the platform while the platform access stairs (52), platform guardrails (56), and ceiling mounted winches (54) are deployed as discussed above.

Figure 14:
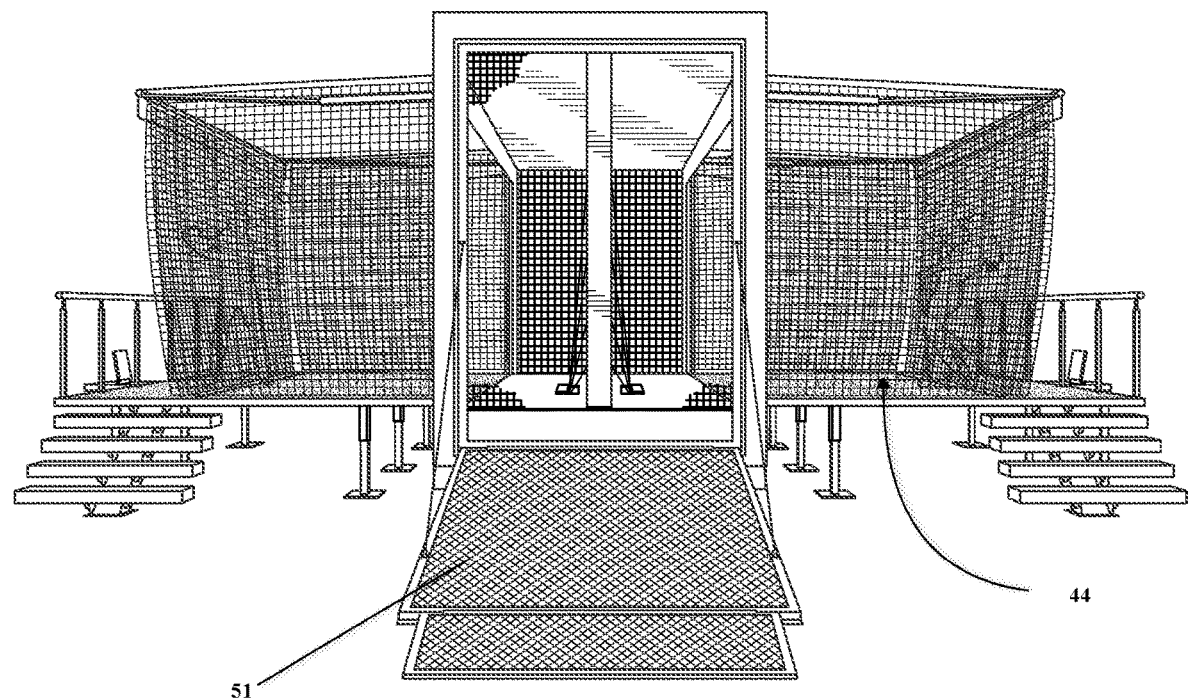
FIG. 14 presents a perspective view of the illustrative double bayed mobile golf simulation system of FIG. 1, wherein the wheeled trailer assembly is depicted in the fully open configuration, with both the side platforms and the rear door deployed (i.e., "all access mode").
Figure 15:
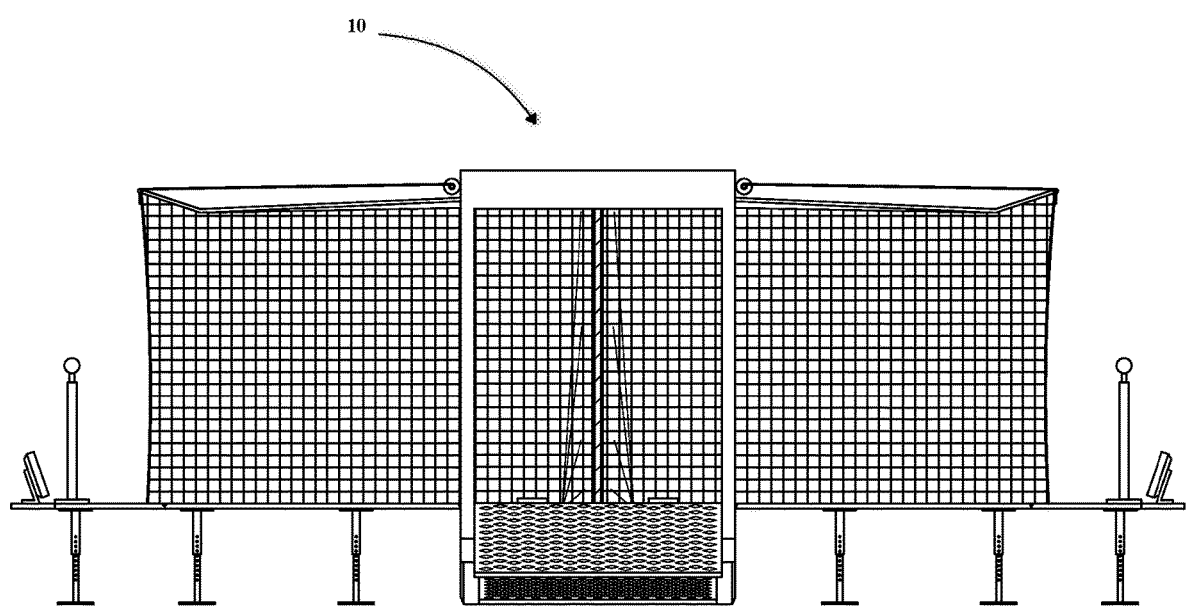
FIG. 15 presents an end elevation view of the mobile golf simulation system of FIG. 10.
Figure 16:
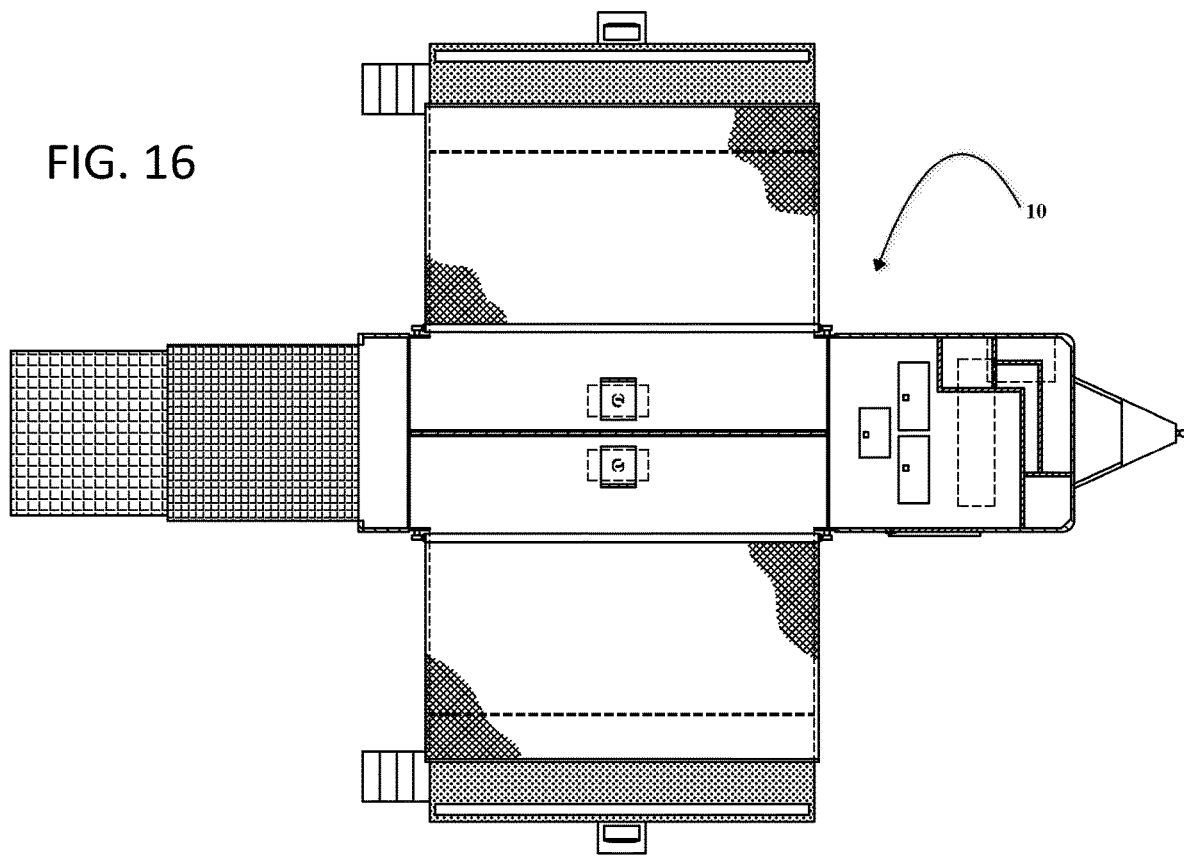
FIG. 16 presents a top sectional view of the mobile golf simulation system of FIG. 10.
Figure 17:
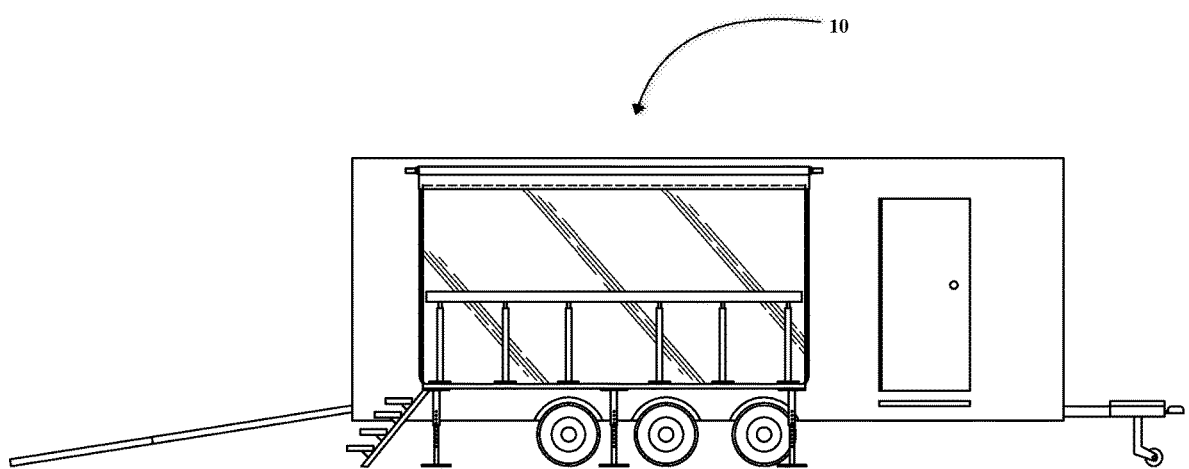
FIG. 17 presents a side elevational view of the mobile golf simulation system of FIG. 10.

FIG. 14 presents the trailer assembly (10) of FIG. 1 in "fully open mode", wherein the trailer box is depicted with both side platforms and the rear access ramp in their deployed/open configuration. FIGS. 15-17 present additional views of the trailer assembly in fully open mode. To wit, FIG. 14 presents a perspective view of the illustrative double bayed mobile golf simulation system of FIG. 1, wherein the both sets of lateral platform (40), overhanging sunshade (38) ball-capturing side nets (55), and rear access ramp (51) are depicted in their fully deployed positions. Each platform surface may be further outfitted with a designated action area or "tee box" (44) optimally positioned between the rear radar unit and the forward impact screen. As noted previously, the forward interior (27) may be optionally outfitted with designated storage compartments (57) and built-in cabinet units (63) as needed to store the requisite electrical, electronic, and/or power components needed to run the various audio/visual and computer operations. The top surface (41) of the platform may be optionally provided with a padded turf overlay (43) while the bottom surface (42) is outfitted with a number of adjustable legs (46) that ensure a stable, even playing surface. Likewise, the requisite component(s) of the golf simulation unit, such as a Trackman radar kit, may be attached an outer edge of the platform while the platform access stairs (52), platform guardrails (56), and ceiling mounted winches (54) are deployed as discussed above.

Although not pictured, it will be readily understood by the skilled artisan that the simulation unit may be provided with conventional lighting and camera components needed to enhance the simulation experience as well as day and night play. As such, the mobile golf simulation system of the present invention may optionally further include:

- requisite stereo components (e.g., speakers, amplifiers, receivers, etc.) necessary to impart audio instructions and play music and ambient sounds in a surround sound experience;
- cameras having both recording and/or live streaming capabilities that can capture the players in action;
- inside and outside lighting; and
- one or more externally facing television monitors to allow an audience to view the resulting simulations.

Ideally, the projector visuals should be vivid in both the indoor/outdoor experience.

INDUSTRIAL APPLICABILITY

In sum, the mobile golf simulation system of the present invention includes a wheeled trailer that preferably houses the following components:

- a "false" wall, more preferably a blackout wall that precludes both the passage of light and radar therethrough, that runs parallel to the longitudinal axis of the trailer, preferably bisecting at least a portion of the trailer it into two opposed lateral sections ("side bays");
- two large screens, each mounted to an opposite side of the false wall, said screen(s) being on the order of 12 to 16 feet, more preferably 14 to 15 feet wide by 9 to 12 feet, more preferably 10 to 11 feet high;
- a pair of lateral outer walls ("stage doors") that each may be deployed and extended to form respective side platforms that each include a padded turf stage and tee area set at least 10 inches from the impact video screen, more preferably at least 11 inches;
- a launch monitor and simulator tracking system, such as the TrackMan™ radar system, situated at least 7 inches from each ball/tee area, more preferably at least 9 inches and preferably contained within a hard case for protection and security;
- a computer, monitor, and at least one projector networked together and in electronic communication with the launch monitor and simulator tracking system that are both secured and easily accessible, with each projector being preferably stowed and operable from underneath the respective turf stage; and
- an optional series of nets that extends along the sides of each deployed platform to keep balls from being hit out of the trailer;

The present invention addresses a need in the art by providing a mobile golf simulation system that is not only readily transported but may be readily deployed and collapsed as needed, at any number of outdoor locations, with only minimal manpower and minimal time. In addition, in contrast to prior art alternatives, the double-bayed mobile golf simulation system of the present invention permits two participants to play simultaneously.

While the invention has been described in detail and with reference to specific embodiments thereof, it will be apparent to one skilled in the art that various changes and modifications can be made therein without departing from the spirit and scope of the invention.

What is claimed:

1. A double-bayed mobile golf simulation system comprising:
   a. a wheeled trailer assembly comprised of:
      i. a horizontal frame comprising at least one longitudinal support and at least one transverse axle having a wheel disposed at each axle end;
      ii. a rectangular trailer box resting atop and attached to said horizontal frame, wherein said trailer box is characterized by (a) front and rear end panels connected to each other by two opposed side panels to thereby form the four vertical walls of said trailer box and (b) horizontally arrayed bottom and top panels disposed over and under said four vertical walls to thereby form the respective floor and ceiling of said trailer box; and
      iii. a partition wall having at least one layer of a radar-absorbing material disposed thereover, wherein said partition wall extends longitudinally through the middle of said trailer box so as to divide said trailer interior into respective left and right side bays;
   b. a first screen attached to the left side of said partition wall and a second screen attached to the right side of said partition wall; and
   c. first and second golf simulation units contained within each of said side bays, wherein each golf simulation unit is networked to a computer system that, in turn, controls respective left and right side projectors, further wherein said left side projector transmits video to said left side screen and said right side projector transmits video to said right side screen and said radar absorbing material prevents the passage of video between said screens;

wherein:
   each side panel includes a horizontally hinged wall portion that, in a first locked configuration, is securely attached to the remainder of said trailer box by a series of spring-assisted compression locks, but that may be unlocked from the remainder of said trailer box and laterally deployed to form a side platform that includes a padded turf stage and tee area on its top surface and a series of adjustable stage legs on its bottom surface.

2. The mobile golf simulation system of claim 1, wherein at least a portion of said rear end panel comprises a horizontally hinged rear door that folds down to provide ready access to said trailer box interior.

3. The mobile golf simulation system of claim 2, wherein said horizontally hinged rear door folds down to form a rear access ramp.

4. The mobile golf simulation system of claim 2, wherein said horizontally hinged rear door folds down to form a set of access stairs.

5. A mobile golf simulation system comprising:
 a. a wheeled trailer assembly comprised of:
  i. a horizontal frame comprising at least one longitudinal support and at least one transverse axle having a wheel disposed at each axle end;
  ii. a rectangular trailer box resting atop and attached to said horizontal frame, wherein said trailer box is characterized by (a) front and rear end panels connected to each other by two opposed side panels to thereby form the four vertical walls of said trailer box and (b) horizontally arrayed bottom and top panels disposed over and under said four vertical walls to thereby form the respective floor and ceiling of said trailer box; and a partition wall extending longitudinally through said trailer box so as to divide said trailer interior into at least one side bay;
 b. a first screen attached to a first side of said partition wall; and
 c. at least one golf simulation unit contained within said at least one side bay, wherein said at least one golf simulation unit is networked to a computer system that, in turn, controls at least one projector,
wherein:
at least one of said side panels includes a horizontally hinged wall portion that, in a first locked configuration, is securely attached to the remainder of said trailer box by a series of spring-assisted compression locks, but that may be unlocked from the remainder of said trailer box and laterally deployed to form a side platform that includes a padded turf stage and tee area on its top surface and a series of adjustable stage legs on its bottom surface.

6. The mobile golf simulation system of claim 5, wherein said series of spring-assisted compression locks are arrayed 2 per side in thirds on each wall portion.

7. The mobile golf simulation system of claim 5, at least a portion of said rear end panel comprises a horizontally hinged rear door that folds down to provide ready access to said trailer box interior.

8. The mobile golf simulation system of claim 7, wherein said horizontally hinged rear door folds down to form a rear access ramp.

9. The mobile golf simulation system of claim 7, wherein said horizontally hinged rear door folds down to form a set of access stairs.

10. The mobile golf simulation system of claim 5, wherein said partition wall divides said trailer interior into respective first and second side bays, further wherein both of said side panels include a horizontally hinged wall portion that, in a first locked configuration, is securely attached to the remainder of said trailer box by a series of spring-assisted compression locks, but that may be unlocked from the remainder of said trailer box and laterally deployed to form first and second side platforms that are level with said floating floor, each of which includes a padded turf stage and tee area on its top surface and a series of adjustable stage legs on its bottom surface.

11. The mobile golf simulation system of claim 5, wherein said trailer box further contains a motorized mechanism to control and automate deployment of said side platforms.

12. The mobile golf simulation system of claim 5, wherein said horizontal frame comprises two axles and four bogie wheels.

13. The mobile golf simulation system of claim 5, wherein said horizontal frame comprises three axles and six bogie wheels.

14. The mobile golf simulation system of claim 5, wherein each side bay further includes a series of ball-capturing nets extending along the sides of said deployed platform and a collapsible sun shade pivotably attached to the top panel of said trailer box.

15. The mobile golf simulation system of claim 5, wherein said horizontal frame further includes a tow hitch and leveling jack at its front end.

16. The mobile golf simulation system of claim 5, wherein the interior front end of said trailer box houses power, electrical, and/or electronic components necessary to run said at least one golf simulation unit and computer system, wherein said interior power, electrical, and/or electronic components are optionally mounted in designated built-in cabinets.

17. The mobile golf simulation system of claim 5, wherein said system further includes (i) stereo components networked to each of said at least one golf simulation units to impart audio instructions, music and/or ambient sounds and (ii) camera components networked to each of said at least one golf simulation units for recording and/or live streaming of player movement.

18. The mobile golf simulation system of claim 17, wherein said system further includes (i) one or more externally mountable video monitors networked to said camera components and/or golf simulation units to allow for audience viewing of player movement and/or simulated golf play and (ii) internal and external lighting to allow for night play.

19. The mobile golf simulation system of claim 5, wherein at least one of said two opposed side panels is provided with a side door that together provides access to said interior front end, further wherein said side panel includes a slide-out step unit beneath said side access door.

20. The mobile golf simulation system of claim 5, wherein said wheeled trailer assembly further comprises a floating floor disposed above and parallel to said bottom panel that forms a basement compartment.

21. The mobile golf simulation system of claim 20, wherein said partition wall has at least one layer of a radar-absorbing material disposed thereover, said system further comprising (i) a second screen attached to a second side of said partition wall, opposite said first screen and (ii) a second golf simulation unit contained said second side bay side bay, wherein each golf simulation unit is networked to a computer system that, in turn, controls respective first and second side projectors disposed within said basement compartment, further wherein said first side projector transmits video to said first side screen and said second side projector transmits video to said second side screen and said radar absorbing material prevents the passage of video between said screens.

22. The mobile golf simulation system of claim 20, wherein said at least one projector is disposed within said basement compartment.

* * * * *